(12) United States Patent
Certain et al.

(10) Patent No.: US 8,930,314 B1
(45) Date of Patent: Jan. 6, 2015

(54) DATA SET CAPTURE MANAGEMENT WITH FORECASTING

(71) Applicant: Amazon Technologies, Inc., Reno, NV (US)

(72) Inventors: Tate Andrew Certain, Seattle, WA (US); Matthew S. Garman, Seattle, WA (US); Sachin Jain, Sammamish, WA (US); Fiorenzo Cattaneo, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/966,910

(22) Filed: Aug. 14, 2013

Related U.S. Application Data

(62) Division of application No. 12/869,414, filed on Aug. 26, 2010, now Pat. No. 8,515,910.

(51) Int. Cl.
*G06F 7/00* (2006.01)
*G06F 3/06* (2006.01)

(52) U.S. Cl.
CPC .................................... *G06F 3/0611* (2013.01)
USPC .......................................................... 707/637

(58) Field of Classification Search
USPC .......... 707/637, 999.002, 634, 713, 718, 719, 707/720
See application file for complete search history.

(56) References Cited

U.S. PATENT DOCUMENTS

| | | | | |
|---|---|---|---|---|
| 7,484,242 | B2 * | 1/2009 | Aggarwal et al. | 726/7 |
| 8,185,903 | B2 * | 5/2012 | Fulton et al. | 718/103 |
| 8,290,839 | B1 * | 10/2012 | Houk et al. | 705/35 |
| 2001/0036201 | A1 * | 11/2001 | Dieterich et al. | 370/506 |
| 2003/0216971 | A1 * | 11/2003 | Sick et al. | 705/26 |
| 2005/0071469 | A1 * | 3/2005 | McCollom et al. | 709/225 |
| 2008/0256025 | A1 * | 10/2008 | Bestgen et al. | 707/2 |
| 2010/0043009 | A1 * | 2/2010 | Marchand | 718/104 |

* cited by examiner

*Primary Examiner* — Hung T Vy
(74) *Attorney, Agent, or Firm* — Novak Druce Connolly Bove + Quigg, LLP

(57) ABSTRACT

A set of virtualized computing services may include multiple types of virtualized data store differentiated by characteristics such as latency, throughput, durability and cost. A sequence of captures of a data set from one data store to another may be scheduled to achieve a variety of virtualized computing service user and provider goals such as lowering a probability of data loss, lowering costs, and computing resource load leveling. Data set captures may be scheduled according to policies specifying fixed and flexible schedules and conditions including flexible scheduling windows, target capture frequencies, probability of loss targets and/or cost targets. Capture lifetimes may also be managed with capture retention policies, which may specify fixed and flexible lifetimes and conditions including cost targets. Such data set capture policies may be specified with a Web-based administrative interface to a control plane of the virtualized computing services.

20 Claims, 11 Drawing Sheets

DATA SET CAPTURE MANAGEMENT WITH FORECASTING

CROSS REFERENCE TO RELATED APPLICATIONS

This application is a Divisional of, and accordingly claims the benefit of, U.S. patent application Ser. No. 12/869,414, filed with the U.S. Patent and Trademark Office on Aug. 26, 2010, which is hereby incorporated herein by reference.

BACKGROUND

Networked computing environments continue to grow in terms of both the number and type of computing components, as well as the complexity of component arrangements in the computing environments. Some such computing environments offer virtualized computing services decoupled to various degrees from the underlying computing hardware that ultimately implement the computing services. There are various advantages to such virtualization for both users and providers of virtualized computing services. For example, virtualized computing service users may quickly (e.g., on the order of minutes or seconds) add virtual computing resources in response to increased demand and, just as quickly, release the virtual computing resources for other purposes if demand falls. Such flexibility for users of virtualized computing services can entail both challenges and opportunities for providers of virtualized computing services.

A virtualized file system volume is an example of a virtualized computing service. Users of virtualized file system volumes ("virtual volumes") may create, delete, resize and otherwise reconfigure virtual volumes without concern for the details of how underlying computing resources are allocated. However, virtual volumes may be associated with a set of performance expectations, such as relatively low read/write latency and/or relatively high data throughput that can constrain the allocation of the underlying computing resources and may be associated with various costs including financial costs. Some providers of virtualized computing services offer multiple types of virtualized data storage, for example, each associated with a different set of performance expectations and/or costs. Where multiple types of virtualized data storage are available, users typically move data between the different types of virtualized data storage on a manual and/or ad hoc basis. This can be problematic.

Unmanaged movement of data between different types of virtualized data storage can be suboptimal from the perspectives of both the user and provider of virtualized computing services. For example, unmanaged data movement may be incur more costs than necessary to achieve the same and/or similar goals. Such costs may include financial costs and/or computing resource costs. Unmanaged data movement may exacerbate peak demands on computing resources that support virtualized computing services.

BRIEF DESCRIPTION OF THE DRAWINGS

Various embodiments in accordance with the present disclosure will be described with reference to the drawings, in which.

Same numbers are used throughout the disclosure and figures to reference like components and features, but such repetition of number is for purposes of simplicity of explanation and understanding, and should not be viewed as a limitation on the various embodiments.

DETAILED DESCRIPTION

Figure 1:
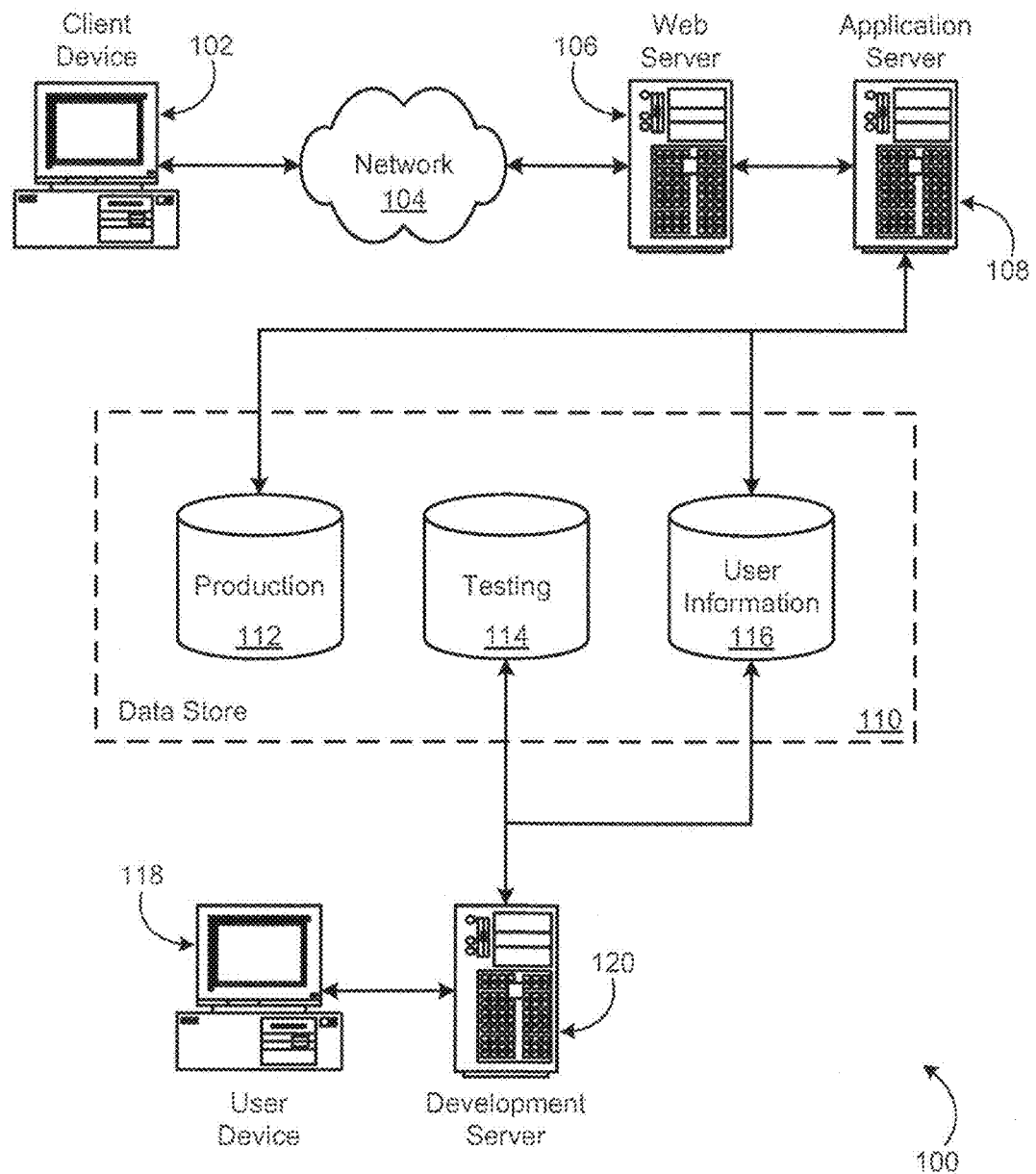
FIG. 1 is a schematic diagram illustrating aspects of an example environment for implementing aspects in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In at least one embodiment, a set of virtualized computing services includes multiple types of virtualized data storage. For example, different types of virtualized data storage may have characteristics with respect to read/write latency (e.g., time to respond to read/write requests), data throughput (e.g., amounts of data that may be read/written during a time period), data durability (e.g., probability of avoiding data loss due to hardware and/or component failure) and cost. In at least one embodiment, the virtualized data storage types include a relatively low latency data store and a relatively high durability data store. For example, the relatively low latency data store may include virtual volumes accessible with conventional file system interfaces, and the relatively high durability data store may be a purpose-built high redundancy data store accessible with a purpose-built interface.

The low latency data store may maintain one or more data sets that are modified over a period of time. For example, one data set may include data for a Web-based application that is updated in accordance with application user actions and/or input. Another data set may include raw and/or processed data transmitted from a recording instrument. In at least one embodiment, a data set maintained by the low latency data store may be captured at various moments in time, and the captures stored in the high durability data store. A capture of a data set is a representation of the data set at a moment in time. Multiple captures of a particular data set may be taken at various moments in time, and later captures may depend on one or more earlier captures. For example, an initial capture of the data set may involve making a full copy of the data set, whereas a later capture of the data set may involve copying data that has changed since an earlier capture.

A sequence of captures of a data set may be scheduled to achieve a variety of virtualized computing service user and provider goals. For example, the sequence of captures may be scheduled to reduce a probability of loss of data in the data set, to lower data storage costs, and/or to level one or more utilization loads on computing resources supporting the virtualized computing service. The captures may be scheduled at particular times and dates, that is, in accordance with a "fixed" schedule. Alternatively, or in addition, the captures may be performed in accordance with a flexible schedule and/or according to at least one data set capture policy. For example, a flexible schedule may specify that a particular capture occur within a time period (e.g., hours or days in duration), and/or that a sequence of captures occur with a target frequency over a time period. In at least one embodiment, a sequence of captures may be scheduled in accordance with probability of loss and/or cost targets.

Different lifetimes may be specified for various captures. For example, a data set capture policy may specify that daily captures are to be stored in a high durability data store for seven days, and that weekly captures are to be stored for a month. Different permissions may be specified for certain captures. For example, monthly captures may be specified as having an unlimited lifetime and as requiring manual deletion by an authenticated user. In at least one embodiment, captures may be specified as having a flexible lifetime. For example, a data set capture policy may specify a target cost, and captures in a capture set may be deleted to keep costs associated with the high durability data store less than the target cost while minimizing impacts to other goals and/or conditions specified by the policy. Specification of capture schedules and/or policies may be performed using any appropriate interface exposed to a user, such as a Web-based user interface.

Various approaches may be implemented in various environments for various applications. For example, FIG. 1 illustrates aspects of an example environment 100 for implementing aspects in accordance with various embodiments. As will be appreciated, although a Web-based environment may be utilized for purposes of explanation, different environments may be utilized, as appropriate, to implement various embodiments. The environment 100 shown includes both a testing or a development portion (or side) and a production portion. The production portion includes an electronic client device 102, which may include any appropriate device operable to send and receive requests, messages, or information over an appropriate network 104 and convey information back to a user of the device 102. Examples of such client devices include personal computers, cell phones, handheld messaging devices, laptop computers, tablet computers, set-top boxes, personal data assistants, electronic book readers, and the like.

The network 104 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 104 includes the Internet, as the environment includes a Web server 106 for receiving requests and serving content in response thereto, although for other networks an alternative device serving a similar purpose could be utilized as would be apparent to one of ordinary skill in the art.

The illustrative environment 100 includes at least one application server 108 and a data store 110. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 108 may include any appropriate hardware and software for integrating with the data store as needed to execute aspects of one or more applications for the client device 102, and may even handle a majority of the data access and business logic for an application. The application server 108 provides access control services in cooperation with the data store 110, and is able to generate content such as text, graphics, audio, and/or video to be transferred to the user, which may be served to the user by the Web server 106 in the form of HTML, XML, or another appropriate structured language in this example.

The handling of all requests and responses, as well as the delivery of content between the client device 102 and the application server 108, may be handled by the Web server 106. It should be understood that the Web and application servers 106, 108 are not required and are merely example components, as structured code discussed herein may be executed on any appropriate device or host machine as discussed elsewhere herein. Further, the environment 100 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 100 may also include a development and/or testing side, which includes a user device 118 allowing a user such as a developer, data administrator, or tester to access the system. The user device 118 may be any appropriate device or machine, such as is described above with respect to the client device 102. The environment 100 may also include a development server 120, which functions similar to the application server 108 but typically runs code during development and testing before the code is deployed and executed on the production side and becomes accessible to outside users, for example. In some embodiments, an application server may function as a development server, and separate production and testing storage may not be utilized.

The data store 110 may include several separate data tables, databases, or other data storage mechanisms and media for storing data relating to a particular aspect. For example, the data store 110 illustrated includes mechanisms for storing production data 112 and user information 116, which may be utilized to serve content for the production side. The data store 110 also is shown to include a mechanism for storing testing data 114, which may be utilized with the user information for the testing side. It should be understood that there may be many other aspects that are stored in the data store 110, such as for page image information and access right information, which may be stored in any of the above listed mechanisms as appropriate or in additional mechanisms in the data store 110.

The data store 110 is operable, through logic associated therewith, to receive instructions from the application server 108 or development server 120, and obtain, update, or otherwise process data in response thereto. In one example, a user might submit a search request for a certain type of item. In this case, the data store 110 might access the user information 116 to verify the identity of the user, and may access the catalog detail information to obtain information about items of that type. The information then may be returned to the user, such as in a results listing on a Web page that the user is able to view via a browser on the user device 102. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
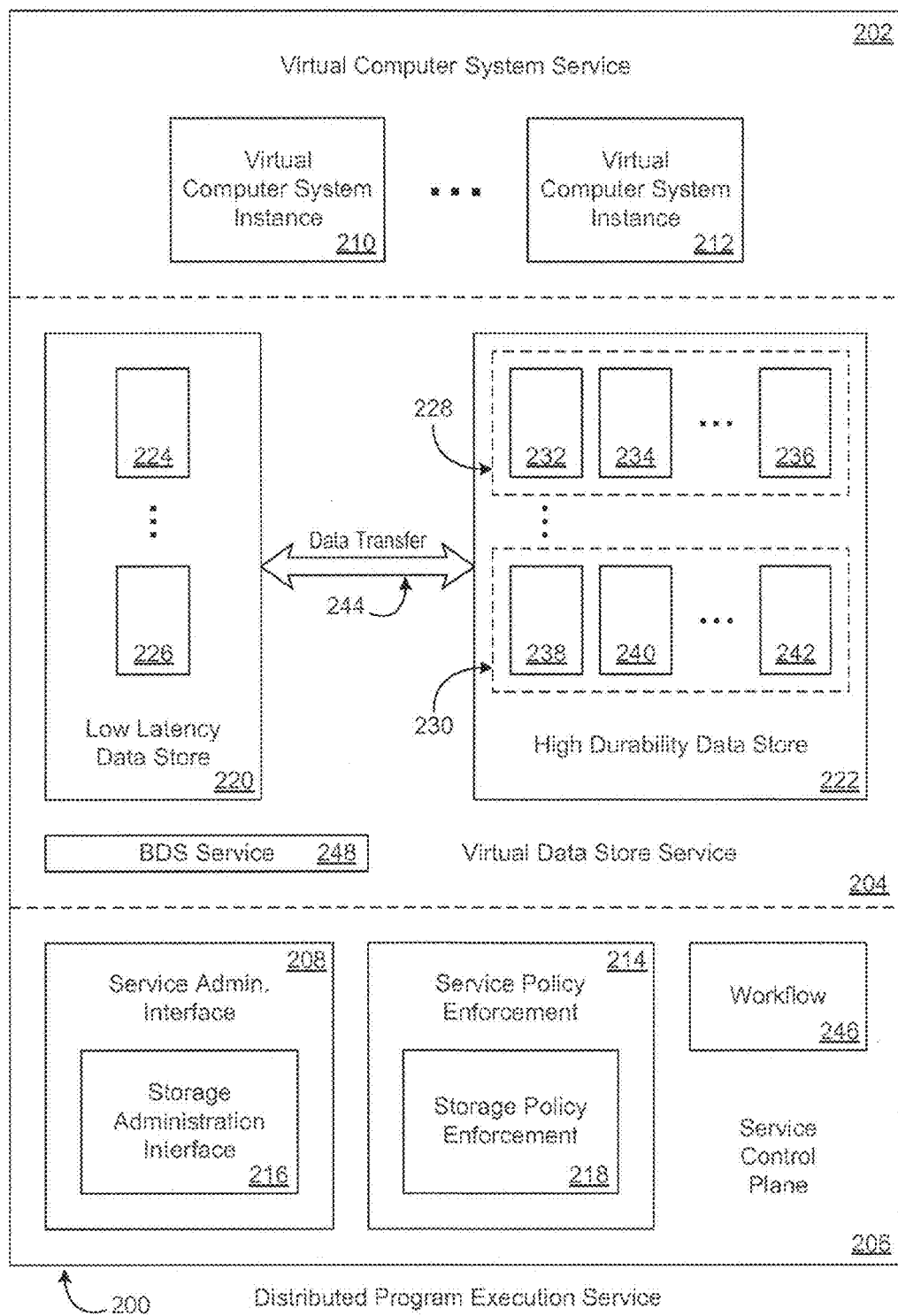
FIG. 2 is a schematic diagram depicting aspects of an example program execution service in accordance with at least one embodiment.

In at least one embodiment, one or more aspects of the environment 100 may incorporate and/or be incorporated into a distributed program execution service. FIG. 2 depicts aspects of an example distributed program execution service 200 in accordance with at least one embodiment. The distributed program execution service 200 provides virtualized computing services, including a virtual computer system service 202 and a virtual data store service 204, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the Web server 106 and the application server 108 described above with reference to FIG. 1, one or more data stores such as the data store 110 of FIG. 1, as well as communication bandwidth in the interlinking network. The computing resources managed by the distributed program execution service 200 are not shown explicitly in FIG. 2 because it is an aspect of the distributed program execution service 200 to emphasize an independence of the virtualized computing services from the computing resources that implement them.

The distributed program execution service 200 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 200 may supply computing resources elastically and/or on-demand, for example, associated with a per resource unit commodity-style pricing plan.

The distributed program execution service 200 may further utilize the computing resources to implement a service control plane 206 configured at least to control the virtualized computing services. The service control plane 206 may include a service administration interface 208. The service administration interface 208 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 202 may provision one or more virtual computer system instances 210, 212. The user may then configure the provisioned virtual computer system instances 210, 212 to execute the user's application programs. The ellipsis between the virtual computer system instances 210 and 212 indicates that the virtual computer system service 202 may support any suitable number (e.g., thousands, millions, and more) of virtual computer system instances although, for clarity, only two are shown.

The service administration interface 208 may further enable users and/or administrators to specify and/or re-specify virtualized computing service policies. Such policies may be maintained and enforced by a service policy enforcement component 214 of the service control plane 206. For example, a storage administration interface 216 portion of the service administration interface 208 may be utilized by users and/or administrators of the virtual data store service 204 to specify virtual data store service policies to be maintained and enforced by a storage policy enforcement component 218 of the service policy enforcement component 214. Various aspects and/or facilities of the virtual computer system service 202 and the virtual data store service 204 including the virtual computer system instances 210, 212, the low latency data store 220, the high durability data store 222, and/or the underlying computing resources may be controlled with interfaces such as application programming interfaces (APIs) and/or Web-based service interfaces. In at least one embodiment, the control plane 206 further includes a workflow component 246 configured at least to interact with and/or guide interaction with the interfaces of the various aspects and/or facilities of the virtual computer system service 202 and the virtual data store service 204 in accordance with one or more workflows.

In at least one embodiment, service administration interface 208 and/or the service policy enforcement component 214 may create, and/or cause the workflow component 246 to create, one or more workflows that are then maintained by the workflow component 246. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 208. As another example, a policy enforcement workflow may be created from a policy enforcement workflow template configured with parameters by the service policy enforcement component 214.

The workflow component 246 may modify, further specify and/or further configure established workflows. For example, the workflow component 246 may select particular computing resources of the distributed program execution service 200 to execute and/or be assigned to particular tasks. Such selection may be based at least in part on the computing resource needs of the particular task as assessed by the workflow component 246. As another example, the workflow component 246 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 204 may include multiple types of virtual data store such as a low latency data store 220 and a high durability data store 222. For example, the low latency data store 220 may maintain one or more data sets 224, 226 which may be read and/or written (collectively, "accessed") by the virtual computer system instances 210, 212 with relatively low latency. The ellipsis between the data sets 224 and 226 indicates that the low latency data store 220 may support any suitable number (e.g., thousands, millions, and more) of data sets although, for clarity, only two are shown. For each data set 224, 226 maintained by the low latency data store 220, the high durability data store 222 may maintain a set of captures 228, 230. Each set of captures 228, 230 may maintain any suitable number of captures 232, 234, 236 and 238, 240, 242 of its associated data set 224, 226, respectively, as indicated by the ellipses. Each capture 232, 234, 236 and 238, 240, 242 may provide a representation of the respective data set 224 and 226 at particular moment in time. Such captures 232, 234, 236 and 238, 240, 242 may be utilized for later inspection including restoration of the respective data set 224 and 226 to its state at the captured moment in time. Although each component of the distributed program execution service 200 may communicate utilizing the underlying network, data transfer 244 between the low latency data store 220 and the high durability data store 222 is highlighted in FIG. 2 because the contribution to utilization load on the underlying network by such data transfer 244 can be significant.

For example, the data sets 224, 226 of the low latency data store 220 may be virtual file system volumes. The low latency data store 220 may include a low overhead virtualization layer providing access to underlying data storage hardware. For example, the virtualization layer of the low latency data store 220 may be low overhead relative to an equivalent layer of the high durability data store 222. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 220 and the high durability data store 222, respectively, are substantially disjoint.

The low latency data store 220 and/or the high durability data store 222 may be considered non-local and/or independent with respect to the virtual computer system instances 210, 212. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 210, 212 may have a validity lifetime corresponding to the virtual computer system instance 210, 212, so that if the virtual computer system instance 210, 212 fails or is de-provisioned, the local data is lost and/or becomes invalid. In at least one embodiment, data sets 224, 226 in non-local storage may be efficiently shared by multiple virtual computer system instances 210, 212. For example, the data sets 224, 226 may be mounted by the virtual computer system instances 210, 212 as virtual file system volumes.

Data stores in the virtual data store service 204, including the low latency data store 220 and/or the high durability data store 222, may be facilitated by and/or implemented with a block data storage (BDS) service 248, at least in part. The BDS service 248 may facilitate the creation, reading, updating and/or deletion of one or more block data storage volumes, such as file system volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 248 may facilitate and/or implement local caching of data blocks as they are transferred through the underlying computing resources of the distributed program execution service 200 including local caching at data store servers implementing the low latency data store 220 and/or the high durability data store 222, and local caching at virtual computer system servers implementing the virtual computer system service 202. In at least one embodiment, the high durability data store 222 is an archive quality data store implemented independent of the BDS service 248. The high durability data store 222 may work with sets of data that are large relative to the data blocks manipulated by the BDS service 248. The high durability data store 222 may be implemented independent of the BDS service 248. For example, with distinct interfaces, protocols and/or storage formats.

Each data set 224, 226 may have a distinct pattern of change over time. For example, the data set 224 may have a higher rate of change than the data set 226. However, in at least one embodiment, bulk average rates of change insufficiently characterize data set change. For example, the rate of change of the data set 224, 226 may itself have a pattern that varies with respect to time of day, day of week, seasonally including expected bursts correlated with holidays and/or special events, and annually. Different portions of the data set 224, 266 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 232 of the data set 224 may involve a substantially full copy of the data set 224 and transfer 244 through the network to the high durability data store 222 (may be a "full capture"). The data set 224 may be associated with various kinds of metadata. Some, none or all of such metadata may be included in a capture 232, 234, 236 of the data set 224 depending on the type of the data set 224. For example, the low latency data store 220 may specify metadata to be included in a capture depending on its cost of reconstruction in a failure recovery scenario. Captures 234, 236 beyond the initial capture 232 may be "incremental", for example, involving a copy of changes to the data set 224 since one or more previous captures. Captures 232, 234, 236 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 234, 236, utilization load on the underlying computing resources can be significantly less for incremental captures compared to full captures.

For example, a capture 232, 234, 236 of the data set 224 may include read access of a set of servers and/or storage devices implementing the low latency data store 220, as well as write access to update metadata, for example, to update a data structure tracking "dirty" data blocks of the data set 224. For the purposes of this description, data blocks of the data set 224 are dirty (with respect to a particular class and/or type of capture) if they have been changed since the most recent capture (of the same class and/or type). Prior to being transferred 244 from the low latency data store 220 to the high durability data store 222, capture 232, 234, 236 data may be compressed and/or encrypted by the set of servers. At the high durability data store 222, received capture 232, 234, 236 data may again be written to an underlying set of servers and/or storage devices. Thus each capture 232, 234, 236 involves a load on finite underlying computing resources including server load and network load.

Captures 232, 234, 236 of the data set 224 may be manually requested, for example, utilizing the storage administration interface 216. In at least one embodiment, the captures 232, 234, 236 may be automatically scheduled in accordance with a data set capture policy. Data set capture policies in accordance with at least one embodiment may be specified with the storage administration interface 216, as well as associated with one or more particular data sets 224, 226. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Flexible data set capture policies may specify that a capture is to occur within a particular time window (e.g., 2 am-6 am everyday, sometime on Sunday, after close of business on the last day of the month) or with a particular frequency (e.g., once per hour, twice per day, once per week, once per month). In at least one embodiment, flexible data set capture policies may specify that captures be scheduled to meet suitable goals, targets and/or conditions (collectively, "capture conditions"). For example, each capture 232, 234, 236 may have an associated cost, financially and/or in terms of computational resources, and the flexible data set capture policy may specify a cost target and/or cost cap for the capture 232, 234, 236 or set of captures 228 including a budget per time period and/or an average cost per capture. As another example, in at least one embodiment, a probability of data loss of a portion of a data set 224 is a function at least of an amount of uncaptured data in the data set 224 at a given time. Accordingly, a flexible data set capture policy may specify a target probability of data loss of a portion of the data set 224, and the storage policy enforcement component 218 may schedule captures of the data set 224 to meet the target by keeping the amount of uncaptured data in the data set 224 below an associated uncaptured data target and/or cap.

Data set capture policies may specify any suitable combination of fixed schedules, flexible schedules, and capture conditions. Data set capture policies may further specify capture lifetimes and/or capture retention goals, targets and/or conditions. For example, a seven day lifetime may be specified for daily captures, a four week lifetime may be specified for weekly captures, and/or an annual lifetime may be specified for monthly captures. Captures may have an unspecified and/or unlimited lifetime, thus requiring manual deletion. Furthermore, particular captures may be protected, for example, may require manual deletion by a designated set of authenticated users. Captures 232, 234, 236 and/or capture sets 228, 230 may be associated with costs (e.g., a periodic fee for storage per gigabyte), and the data set capture policy may specify that captures 232, 234, 236 be automatically deleted to meet a cost target and/or cap. Enforcement of data capture retention policies may analyze associated capture sets 228, 230 to prioritize deletion of redundant captures and/or prohibit deletion of a capture that would prevent restoration of the data set 224 to its state in time corresponding to the most recent capture 232.

Figure 3:
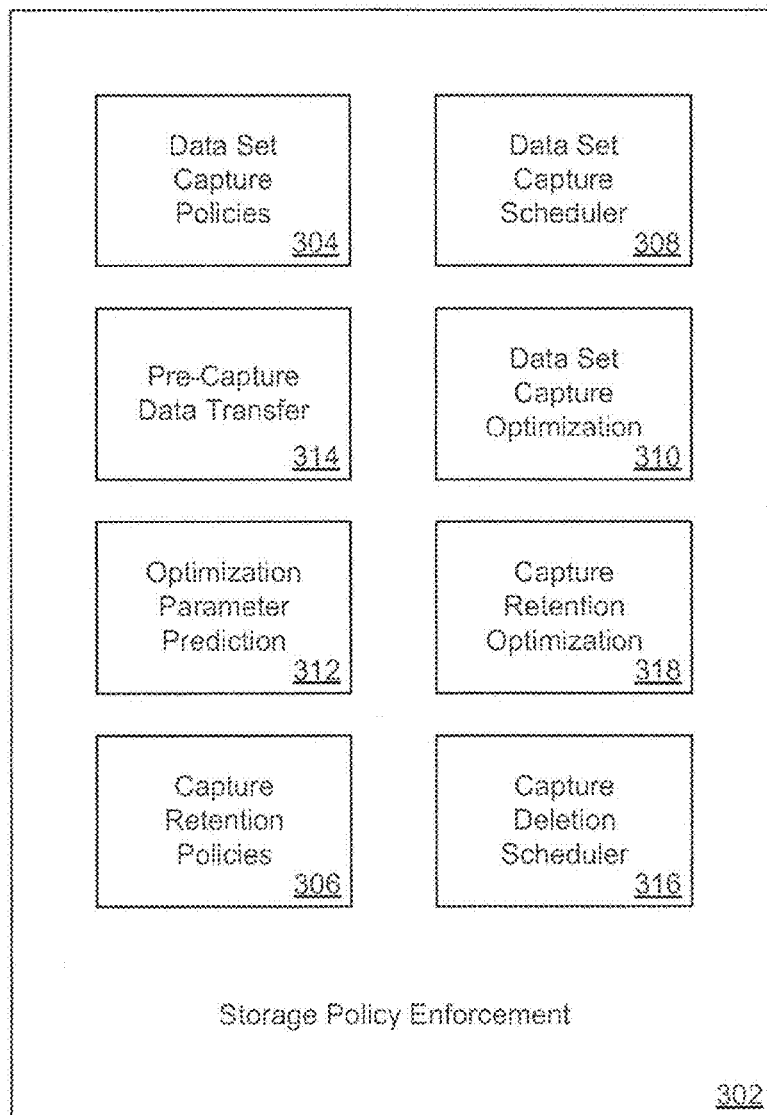
FIG. 3 is a schematic diagram depicting aspects of an example storage policy enforcement component in accordance with at least one embodiment.

Enforcing data set capture polices may involve multivariable optimizations. FIG. 3 depicts aspects of an example storage policy enforcement component 302 in accordance with at least one embodiment. The storage policy enforcement component 302 is an example of the storage policy enforcement component 218 of FIG. 2. The storage policy enforcement component 302 may maintain one or more collections of data set capture policies 304 specifying schedules and/or conditions for data set capture creation, and one or more collections of capture retention policies 306 specifying schedules and/or conditions for data set capture deletion. For example, the storage administration interface 216 may provide the collections 304, 306 to the storage policy enforcement component 302 separately. Alternatively, the storage administration interface 216 may provide a unified collection of data set capture policies, and the storage policy enforcement component 302 may create the collections 304, 306 in accordance with the unified collection. As another example, the storage policy enforcement component 218 may maintain the unified collection received from the storage administration interface 216.

The storage policy enforcement component 302 may include a data set capture scheduler 308 configured at least to cause data set captures according to fixed schedules. For example, some such fixed schedules may have been explicitly specified by a first collection of the data set capture policies 304, and some may have been determined and/or derived (collectively, "determined") based at least in part on flexible schedules and/or capture conditions specified by a second collection of the data set capture policies 304. A data set capture optimization component 310 may perform such fixed schedule determinations. The data set capture optimization component 310 may draw on any suitable distributed program execution service 200 (FIG. 2) parameter and/or parameter predictions provided by an optimization parameter prediction engine 312 to create fixed schedules for data set captures in accordance with the data set capture polices 304. Such parameters may include attributes of data set captures already scheduled with the data set capture scheduler 308 including historical and estimated data transfer 244 volumes and durations, historical and forecast data store server loads and network loads, current computing resource costs including financial costs, historical and forecast data set change patterns, historical and scheduled pre-capture data transfers, and distributed program execution service 200 component characteristics such as time taken by the low latency data store 220 to recover from loss of redundancy.

The data set capture optimization component 310 may schedule data set captures to optimize, distribute and/or level (collectively, "optimize") computing resource utilization load. Computing resource utilization load may be further optimized with pre-capture data transfers. Where justified by forecast data set change patterns and/or forecast computing resource utilization loads, dirty portions of the data set 224 (FIG. 2) may be transferred 244 to the high durability data store 222 in advance of a scheduled capture time with a goal of reducing data transfer 244 in the period following the scheduled capture time (reducing "post-capture data transfer"). For example, pre-capture data transfers may be justified when a resultant benefit from computing resource utilization load reduction following the scheduled capture time exceeds a computing resource utilization load penalty. Such load penalties can occur due to premature pre-capture data transfer, such as the pre-capture transfer of dirty data that becomes re-dirtied before the scheduled capture time. A pre-capture data transfer component 314 may determine when pre-capture transfers are justified based at least in part on suitable distributed program execution service 200 parameters and/or parameter predictions provided by the optimization parameter prediction engine 312.

The storage policy enforcement component 302 may further include a capture deletion scheduler 316 configured at least to delete data set captures 232-242 (FIG. 2) when their specified lifetimes expire. For example, the capture retention policies 306 may specify explicit lifetimes for some captures, and a capture retention optimization component 318 may determine lifetimes for other captures in accordance with the capture retention policies 306. The capture retention optimization component 318 may make such determinations based at least in part on suitable distributed program execution service 200 parameters, including attributes of the capture sets 228, 230, and/or parameter predictions provided by the optimization parameter prediction engine 312.

Figure 4:
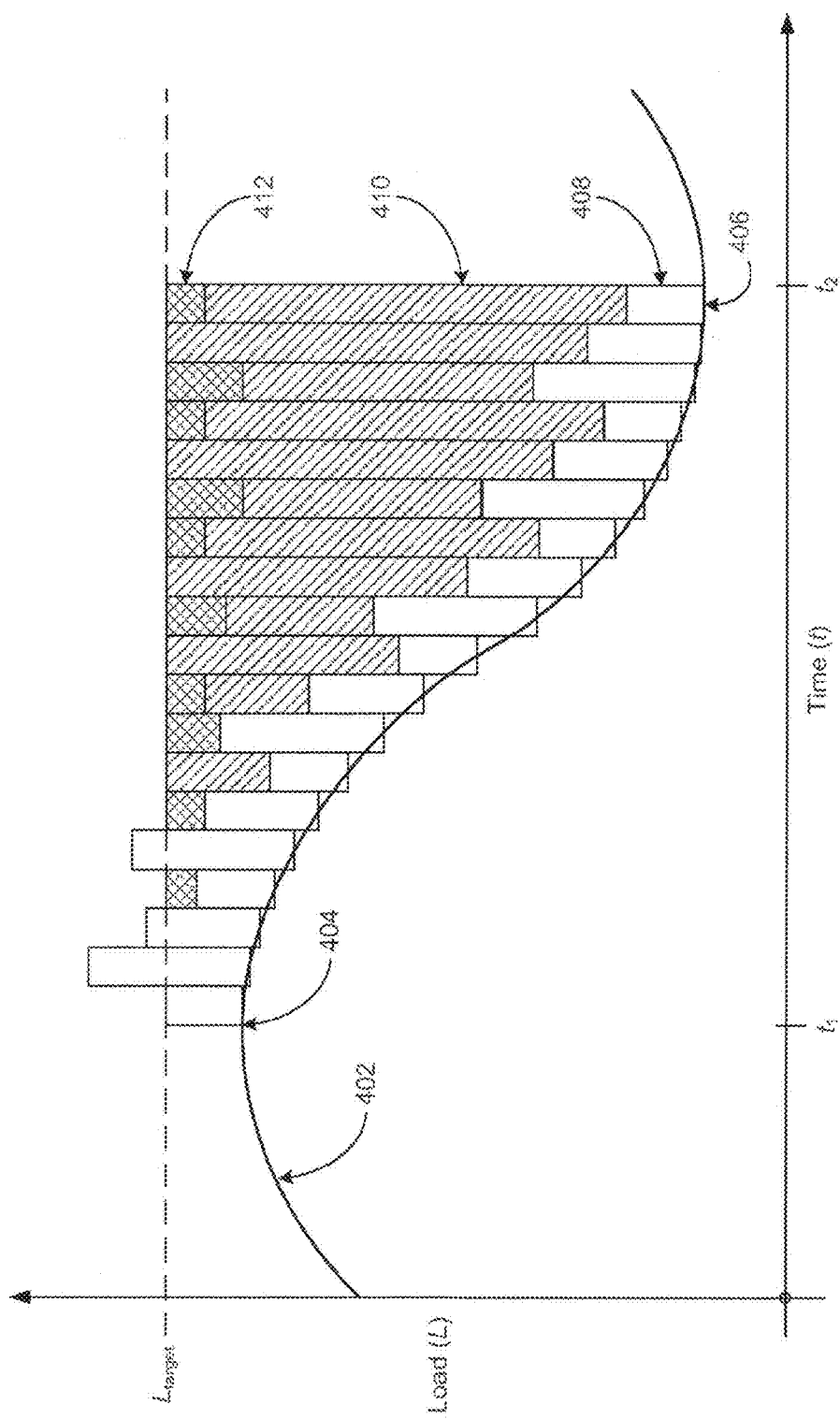
FIG. 4 is a load diagram depicting aspects of an example computing resource utilization load optimization in accordance with at least one embodiment.

As an example, suppose the data set capture policies 304 include policies specifying data set captures with fixed and flexible schedules. FIG. 4 depicts aspects of a corresponding example computing resource utilization load optimization that may be performed by the data set capture optimization component 310 in accordance with at least one embodiment. FIG. 4 shows a base load 402 varying over time. The base load 402 corresponds to a distributed program execution service 200 (FIG. 2) computing resource load. For example, the base load 402 may correspond to a data store server load, a network load, or a combination thereof. The base load 402 may correspond to a computing resource load incurred independent of computing resource loads imposed by data set capture. For example, the base load 402 may be due to activities of virtual computing service user applications hosted by the virtual computer system instances 210, 212. The base load 402 depicted in FIG. 4 includes a peak 404 (corresponding to a potential period of over-utilization) and a trough 406 (corresponding to a potential period of under-utilization), however such base load curves may include any suitable number of peaks and troughs.

In the example depicted in FIG. 4, the data set capture optimization component 310 (FIG. 3) is scheduling data set captures in accordance with data set capture policies specifying fixed schedules 408 (unfilled rectangles), and data set captures in accordance with data set capture policies specifying flexible schedules 410 (rectangles filled with diagonal lines). The pre-capture data transfer component 314 further schedules pre-capture transfers 412 (crosshatched rectangles). The size of the rectangles 408, 410, 412 corresponds to the depicted amount of load (L) placed upon the computing resources for the depicted amount of time (t). The storage policy enforcement component 302 is scheduling the data set captures and pre-capture transfers over a particular time period from time $t_1$ to time $t_2$. In this example, the storage policy enforcement component 302 is performing the scheduling at a time prior to time $t_1$, so the time period from time $t_1$ to time $t_2$ is in the future and is called the forecast period.

The optimization parameter prediction engine 312 (FIG. 3) may forecast the base load 402 over the forecast period. For example, the optimization parameter prediction engine 312 may forecast the base load 402 based at least in part on associated historical computing resource load patterns. The historical computing resource load patterns may be with respect to the distributed program execution service 200 (FIG. 2) as a whole, the virtual data store service 204, particular data sets 224, 226 and/or a particular user of the virtual computing services. The optimization parameter prediction engine 312 may further take into account the data set captures 408 scheduled according to a fixed schedule during the forecast period. Given that forecast load during the forecast period, the data set capture optimization component 310 may then schedule data set captures 410 associated with flexible schedules, with a goal of keeping the total forecast load less than a target load $L_{target}$. The pre-capture data transfer component 314 may then schedule pre-capture data transfers 412 where justified and, again, with the goal of keeping the total forecast load less than the target load $L_{target}$. Each type of computational resource and/or combination thereof may have a different target load $L_{target}$.

Figure 5:
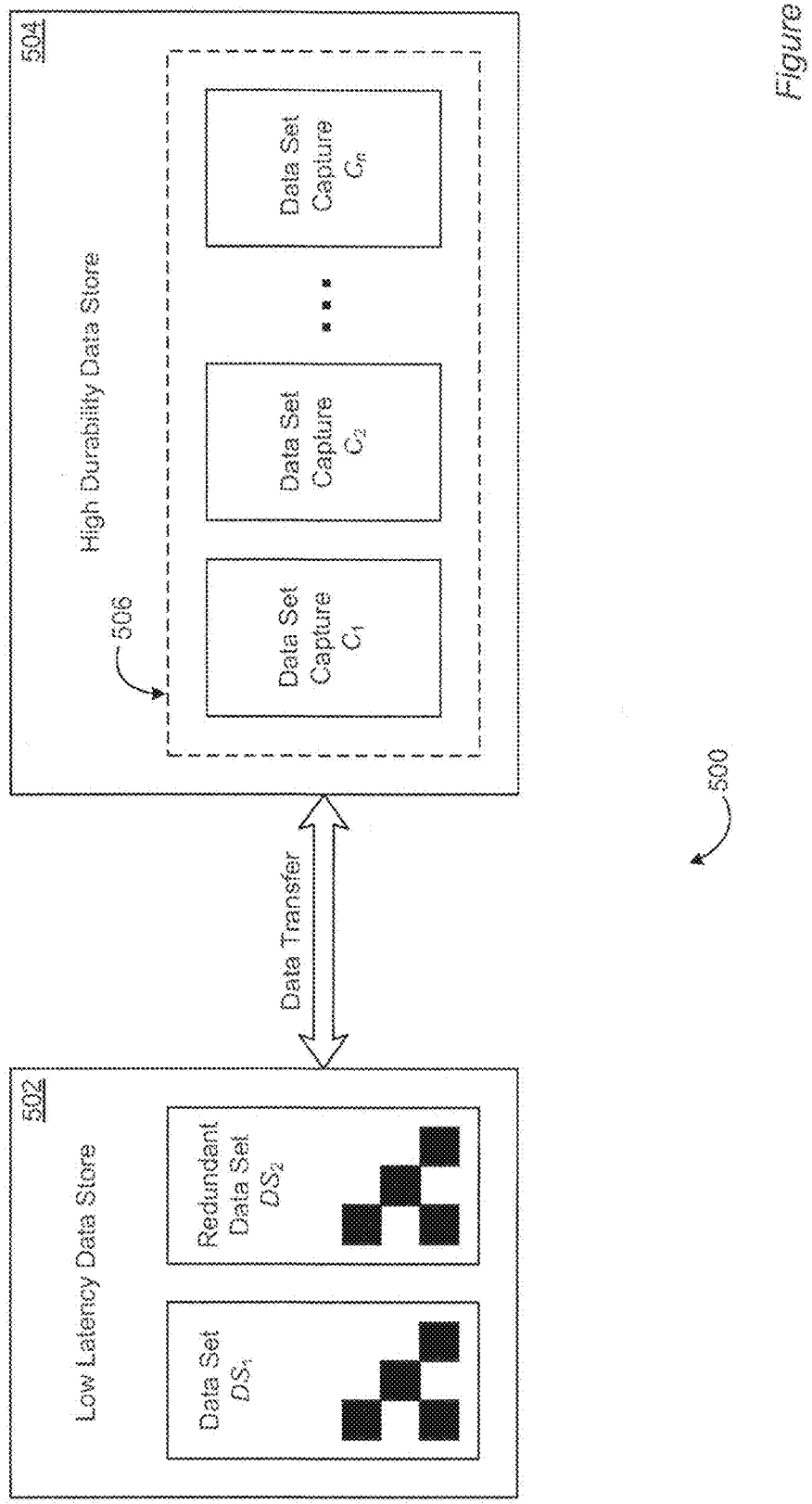
FIG. 5 is a schematic diagram depicting aspects of an example virtual data store service in accordance with at least one embodiment.

In at least one embodiment, the low latency data store 220 (FIG. 2) may maintain data sets 224, 226 with redundant components. For example, the set of computing resources allocated to the low latency data store 220 may be utilized to maintain at least one redundant copy of each data set 224, 226. FIG. 5 depicts aspects of an example virtual data store service 500 in accordance with at least one embodiment. The virtual data store service 500 is an example of the virtual data store service 204 of FIG. 2. The virtual data store service 500 includes a low latency data store 502 and a high durability data store 504 corresponding to the low latency data store 220 and the high durability data store 222, respectively, of FIG. 2. In this example, the low latency data store 502 maintains a data set $DS_1$ corresponding to the data set 224 of FIG. 2. The low latency data store 502 also maintains a redundant copy $DS_2$ of the data set $DS_1$ to guard against data loss due to underlying hardware failures. To further guard against data loss, the a corresponding collection 506 of captures $C_1$, $C_2$, ..., $C_n$ of the data set $DS_1$ has also been established.

Figure 6:
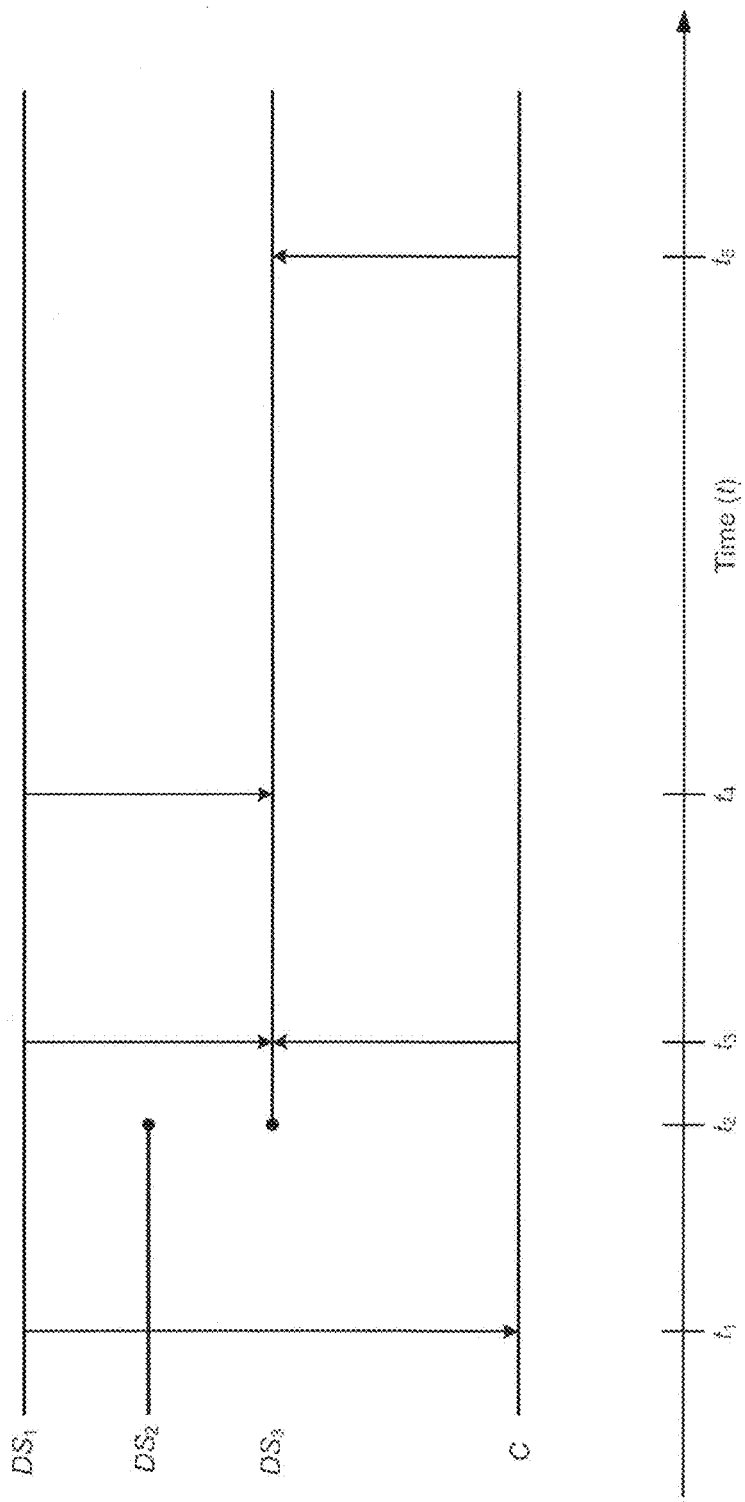
FIG. 6 is a sequence diagram depicting aspects of an example loss and recovery of data set redundancy in accordance with at least one embodiment.

FIG. 6 depicts aspects of an example loss and recovery of data set redundancy in accordance with at least one embodiment. Prior to time $t_1$, data set $DS_1$ and redundant data set $DS_2$ are being maintained as normal by the low latency data store 502 of FIG. 5, so that data set redundancy exists for the data set $DS_1$. At time $t_1$, a scheduled capture of the data set $DS_1$ is carried out, creating most recent capture $C_n$. At time $t_2$, a hardware failure occurs resulting in the loss of the redundant data set $DS_2$. Immediately, the low latency data store 502 begins the process of restoring redundancy by establishing data set $DS_3$ (not shown in FIG. 5). However, data set $DS_3$ begins empty, and may require an initialization period before it is ready to receive data. For example, the data sets $DS_1$ and $DS_3$ may be virtual file system volumes. At time $t_3$, the new data set $DS_3$ is ready to receive data, and begins receiving data both from the collection 506 of captures $C_1, C_2, \ldots, C_n$ (collectively denoted C) and the data set $DS_1$.

The data sets $DS_1$, $DS_2$, $DS_3$ may be large. For example, on the order of gigabytes, terabytes and more. Thus complete restoration of redundancy may take significant time. However, it is typical for virtual computing services user applications to access a relatively small proportion of a given data set $DS_1$, during a particular time period. Utility may be gained by restoring redundancy in an on-demand or "lazy" manner. Until redundancy is restored, the data set $DS_1$ may be vulnerable to data loss, for example, due to further hardware failures. A first phase in redundancy restoration may be to copy that portion of the data set $DS_1$ that has changed since the most recent capture $C_n$ at time $t_1$ (i.e., the uncaptured portion of the data set $DS_1$). FIG. 6 depicts the first phase as completing at time $t_4$. At time $t_4$, a partial or lazy redundancy restoration may be considered to have occurred, with full redundancy restored later at time $t_5$, when data transfer from the collection of captures C completes.

Once partial redundancy restoration has occurred at time $t_4$, a risk of data loss from data set $DS_1$ may be significantly reduced. The time period from time $t_3$ to time $t_4$, may depend upon a redundancy restoration characteristic of the low latency data store 502 (FIG. 5), for example, available bandwidth for copying uncaptured data between the data sets $DS_1$ and $DS_3$. In at least one embodiment, the time period from time $t_3$ to time $t_4$ may be reduced by reducing the amount of uncaptured data in data set $DS_1$, for example, by more frequent captures of the data set $DS_1$. The data set capture optimization component 310 (FIG. 3) may have access to the redundancy restoration characteristic of the low latency data store 502 and thus may determine suitable capture frequencies to achieve probability of data loss targets. The times $t_1, t_2, t_3, t_4, t_5$ on the time line in FIG. 6 indicate a sequence of events and are not necessarily to scale.

Figure 7:
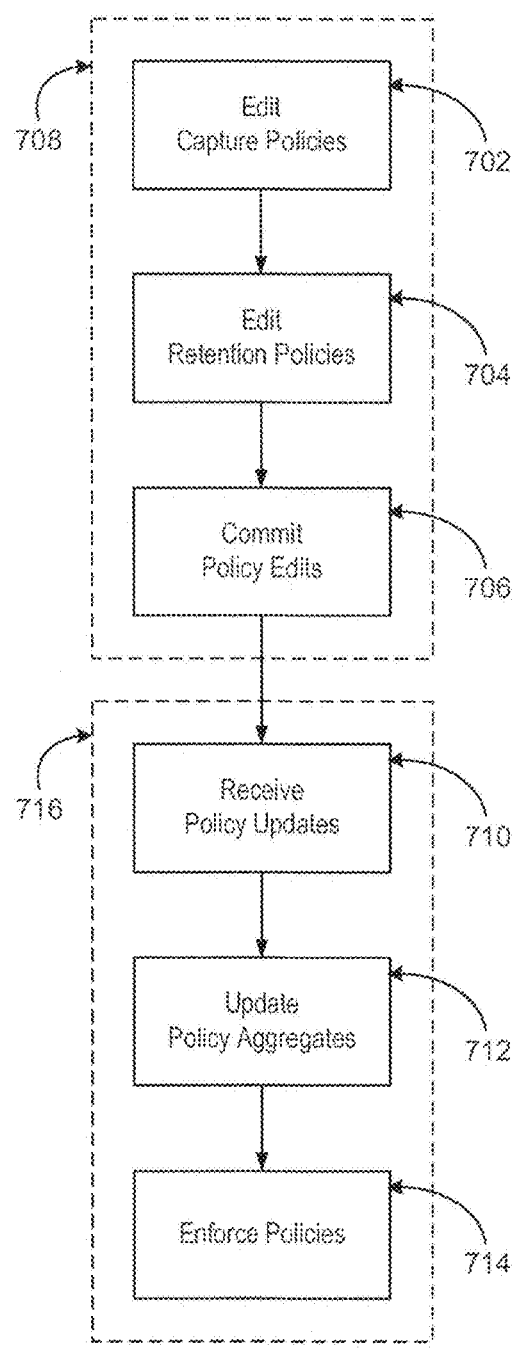
FIG. 7 is a flowchart depicting example steps for data set capture management in accordance with at least one embodiment.

FIG. 7 depicts example steps for data set capture management that may be performed in accordance with at least one embodiment. At step 702, one or more data set capture policies may be edited. For example, a user and/or administrator of the distributed program execution service 200 (FIG. 2) may edit data set capture policies associated with various data sets 224, 226 with the storage administration interface 216. At step 704, one or more data set capture retention policies may be edited. Again, the user may edit such retention policies with the storage administration interface 216. In at least one embodiment, data set capture policies may include data set capture retention policies, hence step 702 may include step 704. At step 706, edits to data set capture policies and/or data set capture retention policies may be committed. For example, the storage administration interface 216 may submit policy updates and/or updated policies to the storage policy enforcement component 218. The edits and/or policies committed may be selected by the user. The dashed line 708 enclosing steps 702-706 indicates that the steps 702-706 may be integral and/or performed by the storage administration interface 216 responsive to user interaction.

At step 710, one or more policy updates may be received. For example, the storage policy enforcement component 302 (FIG. 3) may receive the policy updates. At step 712, one or more policy aggregates and/or collections may be updated and/or maintained. For example, one of the collections of data set capture policies 304 and/or the collections of capture retention policies 306 may be updated in accordance with the policy updates received at step 710. At step 714, the updated policies may be enforced, for example, by the storage policy enforcement component 302. Steps 710-714 are enclosed by dashed line 716 to indicate that the steps 710-714 may be performed by the storage policy enforcement component 218 (FIG. 2) responsive to received data set capture policies.

Figure 8:
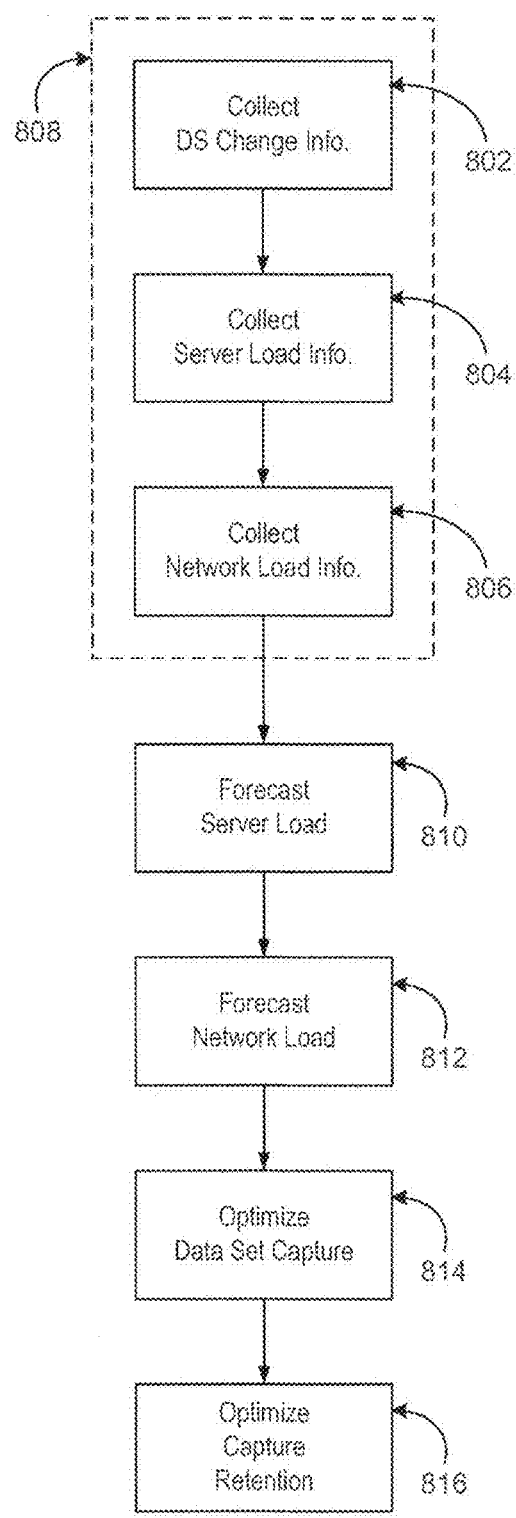
FIG. 8 is a flowchart depicting example steps for enforcing data set capture policies in accordance with at least one embodiment.

FIG. 8 depicts example steps for enforcing data set capture policies in accordance with at least one embodiment. At step 802, information with respect to data set change patterns may be collected. For example, the storage policy enforcement component 218 (FIG. 2) may collect information with respect to data set 224, 226 change patterns. At step 804, information with respect to server load may be collected. For example, the storage policy enforcement component 218 may collect information with respect to loadings of data store servers allocated to the low latency data store 220 and/or the high durability data store 222. At step 806, information with respect to network load may be collected. For example, the storage policy enforcement component 218 may collect information with respect to network utilization load associated with data transfer 244 between the data stores 220 and 222. The collection steps 802-806 are enclosed in a dashed line 808 to indicate that the collection steps 802-806 may be performed in a distributed manner by and/or as part of the normal operation of the distributed program execution service 200. For example, the distributed program execution service 200 may monitor the consumption of various computing resources as part of its computing resource allocation procedures, and data set 224, 226 change pattern information may be more efficiently collected and/or summarized by the low latency data store 220.

At step 810, pertinent server load(s) may be forecast. For example, the optimization parameter prediction engine 312 (FIG. 3) may forecast server loads associated with the data stores 220 and 222 (FIG. 2) based at least in part on the historical information collected at step 804. At step 812, pertinent network load(s) may be forecast. For example, the optimization parameter prediction engine 312 may forecast network loads in the distributed program execution service 200 based at least in part on the historical information collected at step 806. At step 814, data set capture may be optimized. For example, the data set capture optimization component 310 may schedule data set captures in accordance with data set capture policies 304 specifying flexible schedules and/or capture conditions, and/or based at least in part on one or more forecasts provided by the optimization parameter prediction engine 312 such as the forecasts of steps 810 and 812. At step 816, capture retention may be optimized. For example, the capture retention optimization component 318 may schedule capture deletions in accordance with capture retention policies 306 specifying flexible capture lifetimes and/or retention conditions, and/or based at least in part on one or more forecasts provided by the optimization parameter prediction engine 312 such as the forecasts of steps 810 and 812.

Figure 9:
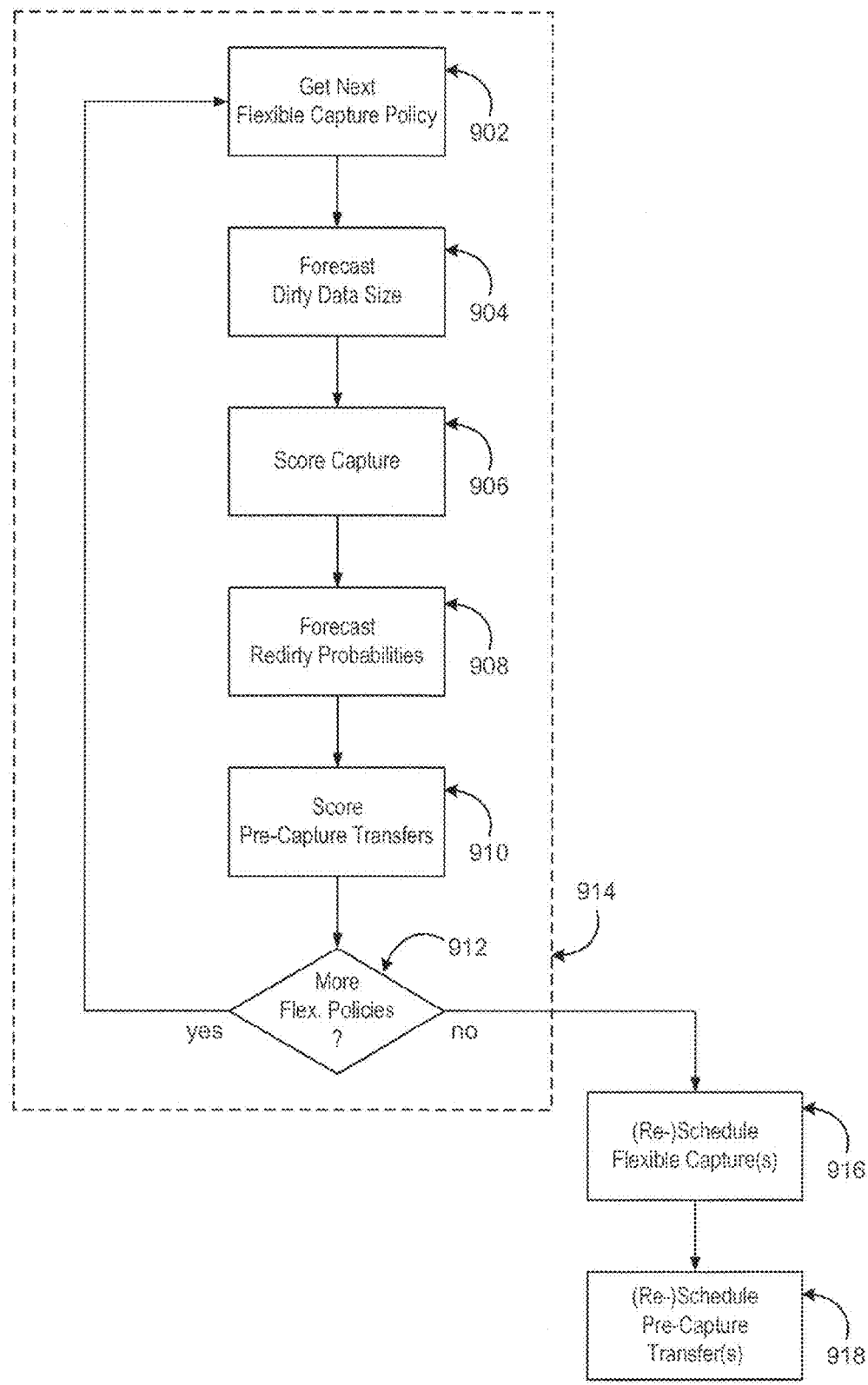
FIG. 9 is a flowchart depicting example steps for data set capture optimization in accordance with at least one embodiment.

FIG. 9 depicts example steps for data set capture optimization in accordance with at least one embodiment. At step 902, a next (e.g., a first) flexible data set capture policy may be obtained. For example, the data set capture optimization component 310 (FIG. 3) may obtain the flexible data set capture policy from one of the collections 304 maintained by the storage policy enforcement component 302. At step 904, a size of dirty data may be forecast. For example, the optimization parameter prediction engine 312 may forecast an amount of dirty data in a data set subject to the flexible data set capture policy obtained at step 902 based at least in part on the data set change information collected at step 802 of FIG. 8. At step 906, a capture of the data set may be scored. For example, the data set capture optimization component 310 may score the capture of the data set with respect to a flexible schedule and/or capture conditions specified by the flexible data set capture policy, and based at least in part on one or more forecasts provided by the optimization parameter prediction engine 312 such as the forecasts of steps 810 and 812 of FIG. 8 and/or the forecast of step 904. The capture of the data set may be scored with respect to immediate scheduling, for example, on a scale of +1 to −1, with +1 corresponding to certainly desirable, and −1 corresponding to certainly undesirable. Alternatively, or in addition, the score for the capture may be forecast throughout a forecast period such as the forecast period from time $t_1$ to time $t_2$ depicted in FIG. 4. For example, such scoring may tend to schedule captures during periods of computing resource under-utilization and/or avoid scheduling captures during periods of computing resource over-utilization.

At step 908, one or more probabilities that currently dirty data in the data set will be re-dirtied (i.e., change again) between now and a scheduled and/or likely time of capture for the data set may be forecast. For example, the optimization parameter prediction engine 312 may forecast such probabilities based at least in part on the data set change information collected at step 802 of FIG. 8. The optimization parameter prediction engine 312 may forecast one such probability for the data set as a whole and/or one or more such probabilities for one or more blocks of the data set. At step 910, one or more pre-capture transfers of data in the data set may be scored. For example, the pre-capture data transfer component 314 may score a desirability of the pre-capture transfer of one or more blocks of the data set based at least in part on one or more forecasts provided by the optimization parameter prediction engine 312 such as the forecasts of steps 810 and 812 of FIG. 8 and/or the forecasts of steps 904 and 908. The desirability of pre-capture transfer(s) may be scored with respect to immediate scheduling, for example, on a scale of +1 to −1, with +1 corresponding to certainly desirable, and −1 corresponding to certainly undesirable. Alternatively, or in addition, the score(s) for the pre-capture transfer(s) may be forecast throughout the forecast period.

At step 912, it may be determined whether there are further flexible capture policies to consider. If so, a procedure incorporating step 912 may progress to step 902. Otherwise, the procedure may progress to step 916. The steps 902-912 are enclosed in a dashed line 914 to indicate that, as will be apparent to one of skill in the art, the flexible capture policies of one of the collections 304 (FIG. 3) need not be processed one by one in an iterative loop as illustrated in FIG. 9, but may be processed as a collection utilizing equivalent set and/or matrix operations for efficiency.

At step 916, one or more data set captures in accordance with data set capture policies specifying flexible schedules and/or capture conditions may be scheduled and/or re-scheduled. For example, the data set capture optimization component 310 (FIG. 3) may select the captures to schedule with the data set capture scheduler 308 based at least in part on the scores determined at step 906 (e.g., in order of desirability as indicated by the scores) and as constrained by available computing resources and/or associated utilization loads. The data set capture scheduler 308 may maintain a collection of tentatively scheduled data set captures that is periodically updated by the data set capture optimization component 310. At step 918, one or more pre-capture data transfers may be scheduled and/or re-scheduled. For example, the pre-capture data transfer component 314 may select candidate pre-capture transfers to schedule based at least in part on the scores determined at step 910 (e.g., in order of desirability as indicated by the scores) and as constrained by available computing resources and/or associated utilization loads.

Figure 10:
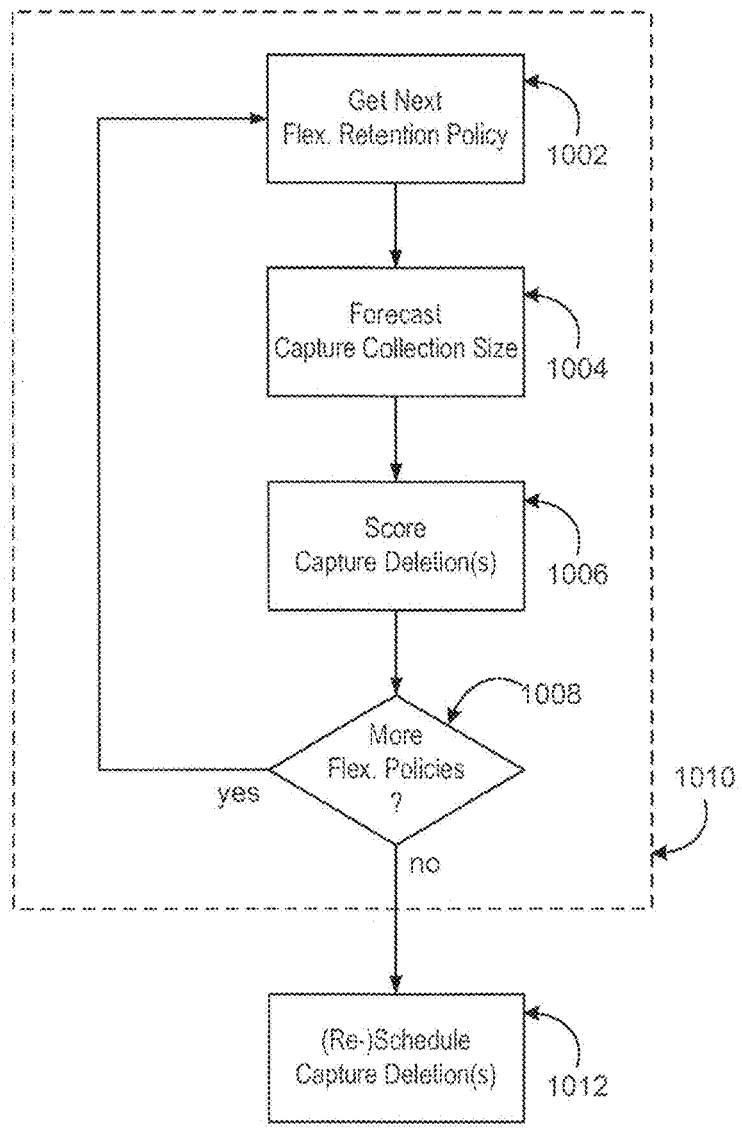
FIG. 10 is a flowchart depicting example steps for capture retention optimization in accordance with at least one embodiment.

FIG. 10 depicts example steps for capture retention optimization in accordance with at least one embodiment. At step 1002, a next (e.g., a first) flexible capture retention policy may be obtained. For example, the capture retention optimization component 318 (FIG. 3) may obtain the flexible capture retention policy from the collection 306 maintained by the storage policy enforcement component 302. At step 1004, a size of a collection of captures may be forecast. For example, the optimization parameter prediction engine 312 may forecast the size of the collection 228 (FIG. 2) of captures based at least in part on data set 224 change information collected at step 802 of FIG. 8 (including rates of change) and/or captures of the data set 224 scheduled with the data set capture scheduler 308. At step 1006, one or more capture deletions may be scored. For example, the capture retention optimization component 318 may score the capture deletions with respect to the flexible lifetimes and/or retention conditions specified by the flexible capture retention policy, and based at least in part on one or more forecasts provided by the optimization parameter prediction engine 312 such as the forecasts of steps 810 and 812 of FIG. 8 and/or the forecast of step 1004. The desirability of capture deletion(s) may be scored with respect to immediate scheduling, for example, on a scale of +1 to −1, with +1 corresponding to certainly desirable, and −1 corresponding to certainly undesirable. Alternatively, or in addition, the score(s) for the capture deletion(s) may be forecast throughout the forecast period.

At step 1008, it may be determined whether there are further flexible capture retention policies to consider. If so, a procedure incorporating step 1008 may progress to step 1002. Otherwise, the procedure may progress to step 1012. The steps 1002-1008 are enclosed in a dashed line 1010 to indicate that, as will be apparent to one of skill in the art, the flexible capture retention policies of the collection 306 (FIG. 3) need not be processed one by one in an iterative loop as illustrated in FIG. 10, but may be processed as a collection utilizing equivalent set and/or matrix operations for efficiency. At step 1012, one or more capture deletions in accordance with capture retention policies specifying flexible lifetimes and/or retention conditions may be scheduled and/or re-scheduled. For example, the capture retention optimization component 318 may select the captures to delete based at least in part on the scores determined at step 1006 (e.g., in order of desirability as indicated by the scores) and as constrained by available computing resources and/or associated utilization loads.

Figure 11:
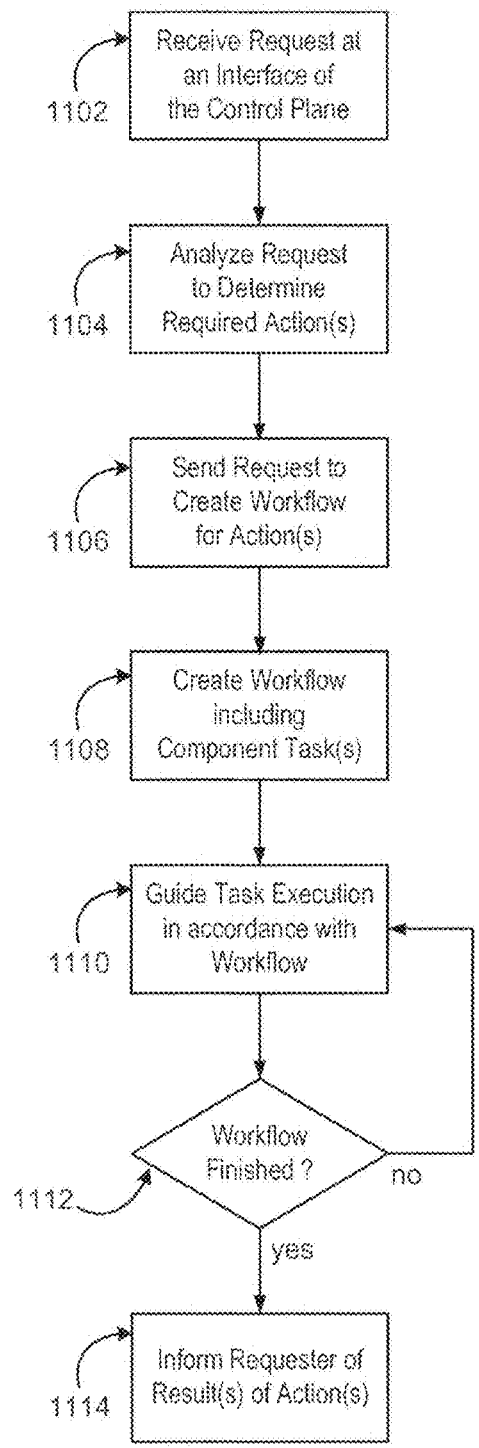
FIG. 11 is a flowchart depicting example steps for a control plane in accordance with at least one embodiment.

FIG. 11 depicts example steps for a control plane in accordance with at least one embodiment. At step 1102, a request may be received by an interface of the control plane. For example, the service administration interface 208 (FIG. 2) of the service control plane 206 may receive the request from a user and/or administrator of the distributed program execution service 200. The request may be a call to a programmatic interface such as an application programming interface (API) or a Web services interface, e.g., utilizing a Simple Object Access Protocol (SOAP) call. Alternatively, or in addition, the request may be received through a Web-based GUI. At step 1104, the request may be analyzed to determine one or more actions required to successfully complete the request. For example, the service administration interface 208 may analyze the request, and determine a set of actions required to establish a data set capture policy. In an embodiment where the interface receiving the request corresponds to a specific action to be performed, the interface may extract information from the request to be utilized in determining aspects and/or parameters of the action to be performed.

At step 1106, a request may be sent to create a workflow based at least in part on the one or more actions determined at step 1104. For example, service administration interface 208 (FIG. 2) and/or the service policy enforcement component 214 may send the request to the workflow component 246. The request to create the workflow may include the action(s), action metadata such as type of action, and/or action parameters. In at least one embodiment, the control plane 206 and/or the workflow component 246 maintains a job queue for such requests, and workflows are created responsive to new additions to the job queue. At step 1108, a workflow and one or more component tasks may be created. For example, the workflow component 246 may analyze the request of step 1106 to determine the appropriate workflow and component tasks to create.

At step 1110, execution of the component task(s) may be guided in accordance with the workflow. For example, the workflow component 246 may activate elements of interfaces of components of virtual data store service 204 and/or the virtual computer system service 202. Alternatively, or in addition, the workflow component 246 may manage bids for execution of the component task(s) by components of the distributed program execution service 200. At step 1112, it may be determined whether the workflow has finished. For example, the workflow component 246 may determine whether a final task in a sequence of tasks managed by the workflow has completed. If so, a procedure including step 1112 may progress to step 1114. Otherwise the procedure may return to step 1110 for a next task and/or task sequence. Workflows may guide multiple task sequences executing in parallel. In this case, it may be that the workflow is not finished until each of the multiple task sequences completes and/or an explicit workflow finished flag is set by one of the component tasks. At step 1114, the sender of the request of step 1102 may be informed of the result(s) of the action(s).

The various embodiments described herein may be implemented in a wide variety of operating environments, which in some cases may include one or more user computers, computing devices, or processing devices which may be utilized to operate any of a number of applications. User or client devices may include any of a number of general purpose personal computers, such as desktop or laptop computers running a standard operating system, as well as cellular, wireless, and handheld devices running mobile software and capable of supporting a number of networking and messaging protocols. Such a system also may include a number of workstations running any of a variety of commercially-available operating systems and other known applications for purposes such as development and database management. These devices also may include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. Such a network may include, for example, a local area network, a wide-area network, a virtual private network, the Internet, an intranet, an extranet, a public switched telephone network, an infrared network, a wireless network, and any combination thereof. The network may, furthermore, incorporate any suitable network topology. Examples of suitable network topologies include, but are not limited to, simple point-to-point, star topology, self organizing peer-to-peer topologies, and combinations thereof.

In embodiments utilizing a Web server, the Web server may run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also may include a computer-readable storage media reader, a communications device (e.g., a modem, a network card (wireless or wired), an infrared communication device, etc.), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules including program modules, services, or other elements located within at least one working memory device, including an operating system and application programs, such as a client application or Web browser. It should be appreciated that alternate embodiments may have numerous variations from that described above. For example, customized hardware might also be utilized and/or particular elements might be implemented in hardware, software (including portable software, such as applets), or both. Further, connection to other computing devices such as network input/output devices may be employed.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which may be utilized to store the desired information and which may be accessed by the a system device. Program modules, program components and/or programmatic objects may include computer-readable and/or computer-executable instructions of and/or corresponding to any suitable computer programming language. In at least one embodiment, each computer-readable medium may be tangible. In at least one embodiment, each computer-readable medium may be non-transitory in time. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computerized system facilitating data set capture management, comprising:
    a first data store configured at least to maintain a data set;
    a second data store capable at least of maintaining a plurality of captures of the data set for later inspection, the plurality of captures corresponding to representations of the data set at selected moments in time;
    a network communicatively coupling at least the first data store and the second data store;
    a storage policy enforcement component configured to, at least:
    schedule at least one capture of the data set in accordance with at least one data set capture policy;
    forecast at least one utilization load of a set of components of the computerized system including the first data store and the network; and
    schedule at least one pre-capture transfer of at least a portion of the data set prior to said at least one capture, the scheduling of said at least one pre-capture transfer arranged at least to optimize said at least one utilization load of the set of components of the computerized system, the optimization based at least in part on the schedule of said at least one capture and the forecast of said at least one utilization load; and
    one or more processors collectively configured at least to facilitate the first data store, the second data store and the storage policy enforcement component.

2. A computerized system according to claim 1, wherein the storage policy enforcement component is further configured to, at least:
    forecast at least one pattern of change of the data set based at least in part on at least one historical pattern of change in the data set; and
    select the portion of the data set to transfer in the at least one pre-capture transfer based at least in part on the forecast the at least one pattern of change of the data set.

3. A computerized system according to claim 2, wherein the scheduling of the at least one pre-capture transfer is based at least in part on the forecast of the at least one pattern of change of the data set.

4. A computerized system according to claim 3, wherein the at least one pre-capture transfer is scheduled so that a resource utilization benefit of reducing post-capture data transfer exceeds a resource utilization detriment of pre-capture data transfer duplication.

5. The computerized system according to claim 1, wherein the storage policy enforcement component configured to at least schedule at least one capture of the data set in accordance with at least one data set capture policy comprises specifying a window of time during which to perform a capture.

6. The computerized system according to claim 1, wherein the storage policy enforcement component configured to at least schedule at least one capture of the data set in accordance with at least one data set capture policy comprises specifying a target frequency of captures of the data set.

7. The computerized system according to claim 1, wherein the storage policy enforcement component configured to at least schedule at least one capture of the data set in accordance with at least one data set capture policy comprises specifying a target probability of loss of at least a portion of the data set from both the first data store and the second data store during a time period.

8. A computer-implemented method for facilitating data set capture management, comprising:
  under control of one or more computer systems configured with executable instructions,
  maintaining a storage policy enforcement component configured to, at least:
    schedule at least one capture of a data set in accordance with at least one data set capture policy;
    forecast at least one utilization load of a set of components including a first data store and a network; and
    schedule at least one pre-capture transfer of at least a portion of the data set prior to the at least one capture, the scheduling of the at least one pre-capture transfer arranged at least to optimize the at least one utilization load of the set of components, the optimization based at least in part on the schedule of the at least one capture and the forecast of the at least one utilization load; and
  causing a first data store to maintain a data set, and causing a second data store to maintain a plurality of captures of the data set for later inspection, the plurality of captures corresponding to representations of the data set at selected moments in time.

9. The computer-implemented method according to claim 8, wherein the storage policy enforcement component is further configured to, at least:
  forecast at least one pattern of change of the data set based at least in part on at least one historical pattern of change in the data set; and
  select the portion of the data set to transfer in said at least one pre-capture transfer based at least in part on the forecast said at least one pattern of change of the data set.

10. The computer-implemented method according to claim 9, wherein the scheduling of the at least one pre-capture transfer is based at least in part on the forecast of the at least one pattern of change of the data set.

11. The computer-implemented method according to claim 10, wherein the at least one pre-capture transfer is scheduled so that a resource utilization benefit of reducing post-capture data transfer exceeds a resource utilization detriment of pre-capture data transfer duplication.

12. The computer-implemented method according to claim 8, wherein the storage policy enforcement component configured to at least schedule at least one capture of the data set in accordance with at least one data set capture policy comprises specifying a window of time during which to perform a capture.

13. The computer-implemented method according to claim 8, wherein the storage policy enforcement component configured to at least schedule at least one capture of the data set in accordance with at least one data set capture policy comprises specifying a target frequency of captures of the data set.

14. The computer-implemented method according to claim 8, wherein the storage policy enforcement component configured to at least schedule at least one capture of the data set in accordance with at least one data set capture policy comprises specifying a target probability of loss of at least a portion of the data set from both the first data store and the second data store during a time period.

15. One or more non-transitory computer-readable media having collectively thereon computer executable instructions that configure one or more computers to collectively, at least:
  maintain a storage policy enforcement component configured to, at least:
    schedule at least one capture of a data set in accordance with at least one data set capture policy;
    forecast at least one utilization load of a set of components including a first data store and a network; and
    schedule at least one pre-capture transfer of at least a portion of the data set prior to the at least one capture, the scheduling of the at least one pre-capture transfer arranged at least to optimize the at least one utilization load of the set of components, the optimization based at least in part on the schedule of the at least one capture and the forecast of the at least one utilization load; and
  causing a first data store to maintain a data set, and causing a second data store to maintain a plurality of captures of the data set for later inspection, the plurality of captures corresponding to representations of the data set at selected moments in time.

16. One or more non-transitory computer-readable media according to claim 15, wherein the storage policy enforcement component is further configured to, at least:
  forecast at least one pattern of change of the data set based at least in part on at least one historical pattern of change in the data set; and
  select the portion of the data set to transfer in said at least one pre-capture transfer based at least in part on the forecast said at least one pattern of change of the data set.

17. One or more non-transitory computer-readable media according to claim 16, wherein the scheduling of the at least one pre-capture transfer is based at least in part on the forecast of the at least one pattern of change of the data set.

18. One or more non-transitory computer-readable media according to claim 17, wherein the at least one pre-capture transfer is scheduled so that a resource utilization benefit of reducing post-capture data transfer exceeds a resource utilization detriment of pre-capture data transfer duplication.

19. One or more non-transitory computer-readable media according to claim 15, wherein the storage policy enforcement component configured to at least schedule at least one capture of the data set in accordance with at least one data set capture policy comprises specifying a window of time during which to perform a capture.

20. One or more non-transitory computer-readable media according to claim 15, wherein the storage policy enforcement component configured to at least schedule at least one capture of the data set in accordance with at least one data set capture policy comprises specifying a target frequency of captures of the data set.

* * * * *